Oct. 10, 1933.  J. S. NAYLOR  1,930,180
SINK CABINET
Filed Aug. 1, 1932  2 Sheets-Sheet 1
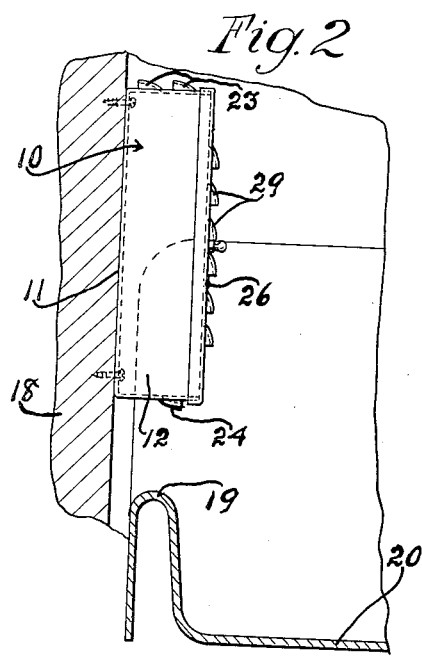
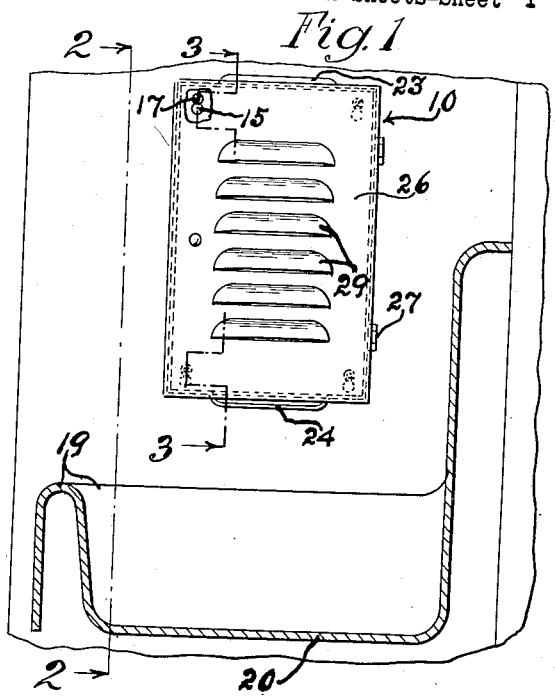
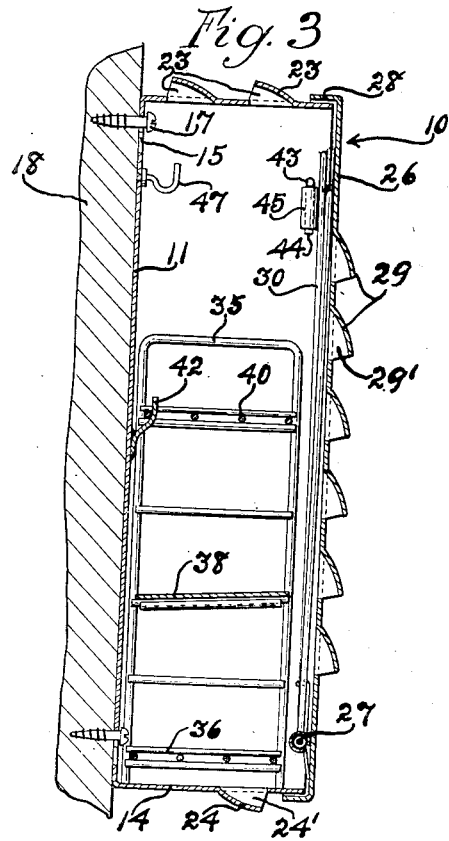
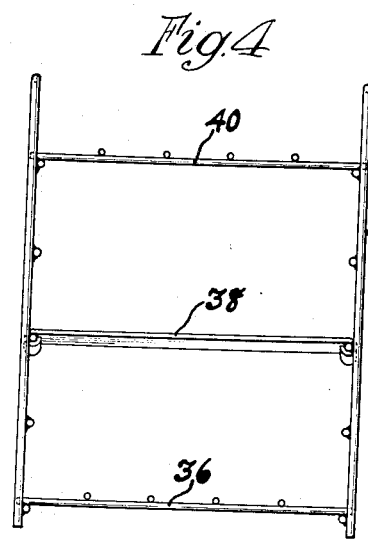
Inventor
Joseph S. Naylor
by J. Daniel Stuwe
Attorney.

Oct. 10, 1933.  J. S. NAYLOR  1,930,180
SINK CABINET
Filed Aug. 1, 1932    2 Sheets-Sheet 2
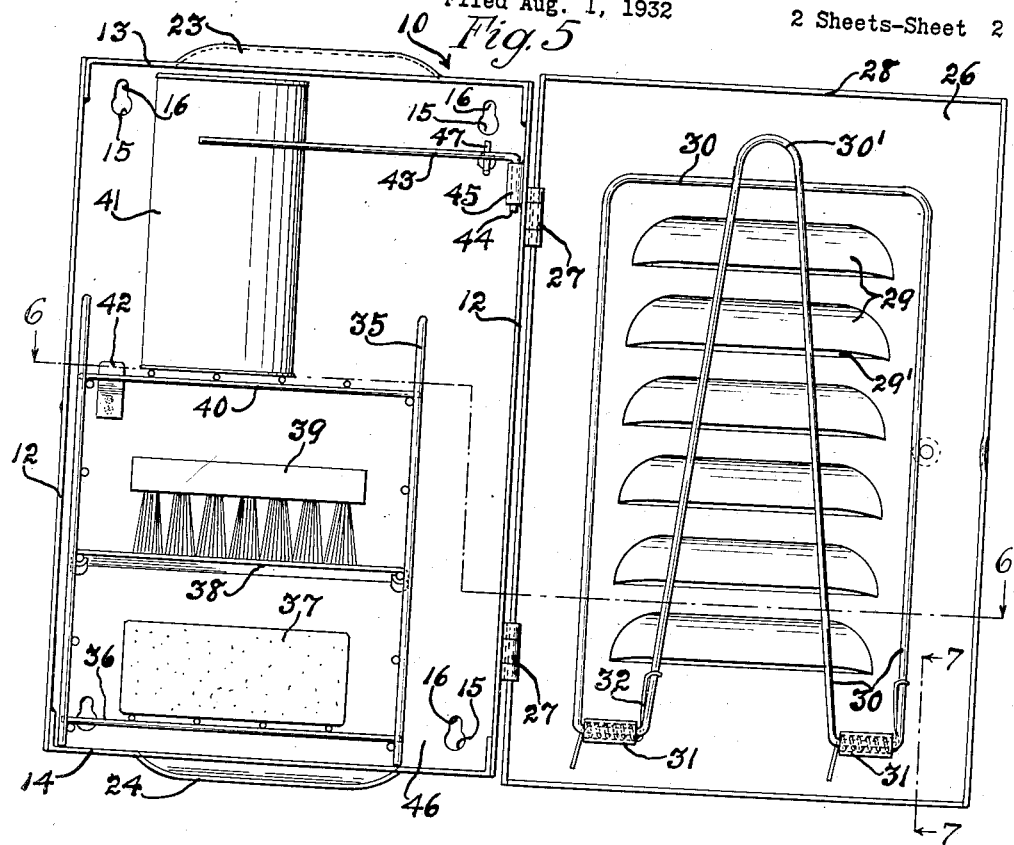
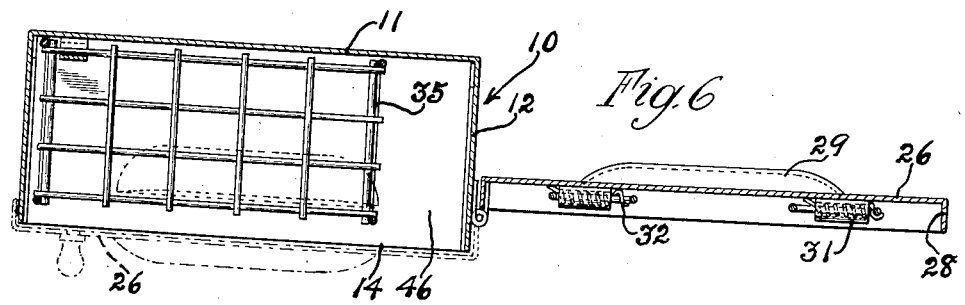
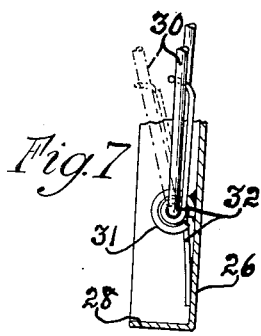
Inventor
Joseph S. Naylor
by J. Daniel Stuwe
Attorney.

Patented Oct. 10, 1933

1,930,180

UNITED STATES PATENT OFFICE 1,930,180

SINK CABINET

Joseph S. Naylor, Elmhurst, Ill.

Application August 1, 1932. Serial No. 627,205

8 Claims. (Cl. 312—113)

This invention relates to a sink cabinet; and more particularly to a small cabinet adapted to be especially useful in connection with a kitchen sink.

The main object of this invention is to provide a sanitary and neat cabinet for properly housing and for fully concealing the articles and materials which are generally used around a kitchen sink and which are then simply laid thereon to be again taken up when needed.

Another object is to provide a cabinet adapted to be mounted adjacent the kitchen sink for housing articles used in connection with the sink, so as to protect and to conserve such articles and prolong their usefulness.

A further object is to provide such a cabinet for housing articles generally used around the sink and for effectively aerating the same to retain them in a sanitary condition.

These and various other objects and advantages will become apparent from the following description, taken in connection with the accompanying drawings, in which the invention is illustrated in its preferred form of construction, it being understood that various other arrangements and forms of construction may be resorted to for carrying out the objects and purposes of this invention.

In the drawings:

Fig. 1 illustrates my invention in front elevation, mounted on the wall directly above the kitchen sink.

Fig. 2 is a side elevational view thereof, taken along line 2—2 of Fig. 1.

Fig. 3 is an enlarged vertical sectional view of my cabinet, taken along line 3—3 of Fig. 1.

Fig. 4 is a front elevational view of the rack for supporting articles.

Fig. 5 is a front elevational view of the open cabinet.

Fig. 6 is a horizontal cross-sectional view thereof, taken along line 6—6 of Fig. 5.

Fig. 7 is an enlarged detail sectional view, taken along line 7—7 of Fig. 5.

In the drawings my invention is illustrated in its preferred form of construction which comprises a cabinet or casing 10 including a back wall 11 and two side walls 12, also a top wall 13 and a bottom wall 14, which are preferably made integral. The back wall is provided with openings 15 having contracted upper necks 16, for receiving suitable screws or supporting elements 17, whereby to mount the cabinet on the wall 18 directly over the adjacent edge 19 of the kitchen sink 20. The top wall has lips or portions 23 punched upwardly therefrom to provide ventilating openings 23' thereunder, thereby forming upper louvers for aerating the casing; while the bottom wall 14 similarly has a portion 24 punched downwardly to provide a ventilating opening 24', thereby forming a suitable bottom louver and at the same time providing drain means for draining liquid from the cabinet and discharging it inwardly of edge 19 into the sink.

It should be noted that the side walls and the back wall are solid, so that the air may pass into opening 24' of the bottom louver and rise upwardly through the cabinet to pass out through openings 23 of the upper louvers.

The door 26 for this cabinet is arranged to form the entire front wall thereof, and it is hinged by suitable hinge means 27 to one of the side walls 12, so that it may be swung fully open, as indicated in Fig. 5 of the drawings. The door has rearwardly extending flanges 28 which overlap the side and top and bottom walls of the cabinet sufficiently to provide a tight closure for the front of the cabinet. Portions 29 are punched outwardly on the door to provide ventilating openings 29' and form front louvers extending forwardly across the intermediate part of said door, substantially as indicated in the drawings.

Means is provided for supporting a dish cloth in a spread position in the casing so as to aerate and dry readily. This means preferably includes a flat rack member 30 made of wire bent into a rectangular form and of a size greater than the combined louvers 29; and this supporting member 30 is preferably mounted on the front door by suitable hinge means or sleeves 31 secured on the door, so that it is swingable away from the door and allows for readily placing the dish cloth thereover and then to hold it against the louvers at the inner side of the door. An extension 30' is formed on the upper part of member 30 to provide a finger-hold for readily grasping the rack and swinging it away from the door.

The hinge portion of member 30 is preferably also provided with spring means 32, which is shown in the form of coil springs wound on the lower arms of member 30 in sleeves 31, and arranged to automatically return said member against the door whenever it has been withdrawn for placing the dish cloth thereon or removing it therefrom. This spring means automatically returns member 30 and constantly holds it in proper position so that the dish cloth is extended across the louvers, practically closing the same and at the same time aerating the cloth.

Means is provided for supporting and housing various articles in the cabinet, and this means preferably comprises a frame or rack 35, which may be made economically of wire, being provided with a plurality of shelves therein for supporting various articles, including a lower shelf 36 which is perforated or made of wire mesh, in order to be adapted to have soap 37 or similar articles supported thereon and have their moisture drain through said shelf onto bottom 14 of the cabinet to be discharged through drain opening 24'. A shelf 38 is mounted in said rack above shelf 36 and article 37 thereon, and it is preferably made of solid material, as indicated in the drawings, so that it is adapted to support an article like a brush 39 which frequently contains moisture. The shelf is preferably slanted downward rearwardly and is spaced slightly from the several walls, so that the moisture from the brush will drip down along the rear wall and will not moisten and dissolve the soap therebeneath; and this shelf also serves to deflect the air toward the walls. An upper shelf 40 is also mounted in rack 35, above shelf 38 and article 39 thereon, and sufficient space is provided between it and top wall 13 of the cabinet to support a can or container 41 thereon containing scouring powder or cleaning material and the like. The rack is preferably mounted and held removably in the cabinet, as by means of a finger or lug 42 secured on the rear wall to engage a rear wire of said rack and allow lifting said rack therefrom, to facilitate cleaning said rack.

A supporting arm or member 43 is provided in the form of a rod which has a bent end portion 44 adapted to be entered in a sleeve 45 secured on the side wall 12, so that the arm 43 may be readily and removably inserted in the sleeve, and so that it may be readily swung thereon. This arm is adapted to support various articles, being well adapted to support a second wash cloth, if desired, and thus acts as auxiliary supporting means in addition to cloth supporting means 30, for supporting wash cloths in the cabinet, and it is positioned so that the wash cloth will depend along the front of rack 35, just inwardly of cloth supporting means 30.

It should be noted that rack 35 is slightly narrower than the cabinet, thereby providing a space 46 of sufficient size between it and the side wall 12 adapted to have a comparatively large brush stand therein. A hook 47 is preferably also provided on the upper part of back wall 11, so that such brush may be hung up on said hook and suspended in said space 46.

With regard to aerating this cabinet, the air will slowly pass through front louvers 29 in the door and through the dish cloth which is pressed tightly against said louvers and door by spring pressed rack member 30. Then, since the rear and side walls are solid, and member 30 holds the dish cloth tight against louvers 29, the air will enter freely through the lower louver 24, pass through meshed shelf 36, and be deflected around solid shelf 38; then pass through meshed shelf 40, and up through top louvers 23, thus effectively aerating the cabinet and the articles therein.

The articles used around the sink are hereby neatly concealed and kept together in order, and are drained and conserved to prolong the life thereof, and at the same time are properly aerated herein.

I claim as my invention:

1. A cabinet adapted to be mounted on the wall over a kitchen sink and having louvers provided in its top and bottom walls, the lower wall louver serving to drain into the sink, and article supporting means in the cabinet including rack means having shelf means provided with openings and also rearwardly declining solid shelf means spaced from the walls of the cabinet.

2. A cabinet adapted to be removably mounted on the wall over a sink and having drain means in its bottom wall to drain into the sink, a rack removably mounted in the cabinet and including a shelf provided with openings positioned above said bottom wall for supporting soap to drain through said shelf to said bottom wall and through said drain means, and a solid shelf over said shelf adapted to support a brush and being spaced from and tilted toward a vertical wall to shed moisture from the brush toward said wall and prevent it from dripping on the soap.

3. A sink cabinet adapted to be mounted over a sink and having louvers in its top wall, also a louver in its bottom wall serving as drain means for directing moisture into said sink, a rack in said cabinet including a lower shelf provided with openings adapted to drain moisture from articles thereon to the bottom wall, and a solid shelf above said lower shelf including rearwardly declining means spaced from the rear wall and adapted to support a moist article thereon and drain water therefrom toward the rear wall to prevent it from dripping onto articles on the lower shelf.

4. A cabinet having louvers provided thereon including louvers in one of its vertical wall members, and means consisting of a bent wire in the shape of a flat rectangular frame mounted in the cabinet for supporting fabric sheet means across the inner side of said louvers to aerate said sheet means and spring hinge means to hold the frame in its operative position.

5. A sink cabinet having louvers in one of its wall members, a supporting member consisting of a flat frame having openings therein and being hinged at one end to the inner side of said wall beyond said louvers for holding a cloth spread across the inner side of said louvered member, an extension on the frame opposite said hinge end to be engaged by the finger for swinging the frame, and spring means for automatically returning said supporting member with the cloth in proper position against the louvered wall member.

6. A cabinet having its front wall arranged as a door hinged thereon and provided with louvers therein, a flat meshed member hinged at its lower end on the inner side of said door below said louvers and adapted to support a wash cloth in spread position across the louvers on said door so as to cover the same and to be aerated thereby, and spring means on the hinge portion of said member for automatically returning it with the wash cloth against said louvers upon being withdrawn therefrom.

7. A rectangular cabinet adapted to be mounted on the wall over a kitchen sink and having three of its four walls solid, a top wall provided with louvers therein, a bottom wall provided with a louver terminating above the sink to drain therein and function as drain means for the cabinet, the fourth vertical wall being in the form of a hinged door provided with louvers therein, means for holding a cloth across the last said louvers and aerating it, and means in the cabinet for supporting articles to be effectively aerated by the air passing through the louvers.

8. A cabinet having solid back and side walls, a top wall provided with louvers therein, a bottom wall provided with a louver to function as drain means for the cabinet, the front wall being in the form of a hinged door provided with louvers therein, means on the front door to support a wash cloth spread across said louvers to practically close the same but aerate the cloth, rack means in the cabinet including a lower shelf provided with openings adapted to drain moisture from articles thereon to the bottom wall, a solid shelf in said rack above said lower shelf and being spaced from said walls and declining rearwardly adapted to drain moisture upon it toward the rear wall of the cabinet and to deflect the air toward the walls of the cabinet, a shelf in said rack above said solid shelf, and a swingable arm in said cabinet adapted to support an article suspended in the front part thereof.

JOSEPH S. NAYLOR.